United States Patent [19]
Pearce

[11] 3,926,369
[45] Dec. 16, 1975

[54] CONTROLLED SPRAYING
[76] Inventor: George W. Pearce, 32 Monument St., Wenham, Mass. 01984
[22] Filed: Nov. 30, 1973
[21] Appl. No.: 420,453

[52] U.S. Cl. .......................... 239/1; 239/8; 239/14; 239/61; 239/DIG. 1
[51] Int. Cl.² ......................................... B05B 17/00
[58] Field of Search ............... 239/61, 62, 2, 14, 75, 239/8, 9, 171, 1, DIG. 1; 137/78

[56] References Cited
UNITED STATES PATENTS

| | | | |
|---|---|---|---|
| 2,524,796 | 10/1950 | Higgins | 239/75 |
| 2,730,402 | 1/1956 | Whiting, Jr. et al. | 239/171 X |
| 3,438,576 | 4/1969 | Handman | 239/2 R |
| 3,523,646 | 8/1970 | Waldrum | 239/171 |
| 3,667,673 | 6/1972 | Knudsen | 239/256 |
| 3,788,543 | 1/1974 | Amand et al. | 239/2 R |
| 3,814,319 | 6/1974 | Loomis | 239/14 |

*Primary Examiner*—Lloyd L. King
*Attorney, Agent, or Firm*—Jerry Cohen; Charles Hieken

[57] ABSTRACT

Insect pestilence is suppressed in a given area by limited injections of insecticide fogging spray at certain occasions of change of wind direction therein and essentially at no other time and in very high dilution and fineness of dispersion of droplets of carrier liquid seeded with micro-particles of insecticide. The method is preferably practiced automatically through the use of apparatus comprising interconnected wind responsive switching means, spray nozzle and valve means, carrier source means, insecticide source means and timing means. The timing means preferably afford time delay of 10–100 seconds before automatically terminating insecticide fogging and after a much longer preselected time interval, on the order of 10 to 100 hours, automatically reset the apparatus to respond to a new shift of wind from a direction previously used to initiate fogging. The apparatus and technique of the invention produce such a fine dispersion of the insecticide or other material that the carrier liquid is substantially evaporated from the sprayed material before the droplets reach the ground.

27 Claims, 6 Drawing Figures

3,926,369

CONTROLLED SPRAYING

BACKGROUND OF THE INVENTION

The present invention relates to insecticide fogging and more particularly to the suppression of insect pestilence in fixed small areas such as a household terrace, lawn or yard area and large areas such as a golf course.

It is an important object of the invention to provide effective usage of pesticides in suppression of insect pestilence in a given area.

It is a further object of the invention to mimimize attention required of persons relying on such suppression consistent with the preceding object.

It is a further object of the invention to minimize usage of pesticides consistent with one or both of the preceding objects.

It is a further object of the invention to provide economically manufacturable and rugged apparatus consistent with one or more the the preceding objects.

It is a further object of the invention to reduce harm to non-target species, such as bees, by the insecticide consistent with one or more of the preceding objects.

It is a further object of the invention to reduce insecticide associated nuisances, such as odor, consistent with one or more of the preceding objects.

It is a further object of the invention to limit the amount and spread of insecticide used at any given time consistent with one or more of the preceding objects.

It is a further object of the invention to provide basic apparatus and techniques usable for small area or large area coverage consistent with one or more of the preceding objects.

It is a further object of the invention to provide a capability of repeated simple adjustment for enhancing optimal fulfillment of one or more of the preceding objects.

It is a further object of the invention to provide finely dispersed sprays of material consistent with one or more of the preceding objects, or per se.

SUMMARY OF THE INVENTION

According to the invention, a carrier flow of water is mixed with a dilute insecticide solution to produce a further diluted and energized insecticide flow which is sprayed into the air under conditions controlled as to one or more of dispersion, dilution, timing of spray initiation, duration of spray and trajectory of spray droplets to impact the ground or foliage in the area to be protected with fine particles of insecticide solute. The hydrostatic pressure of the carrier flow of water produces breakup of the flow to produce fine liquid particles, seeded with insecticide solute, emerging from a spray nozzle. The liquid particles are projected over a sufficient distance to allow essentially complete evaporation of water and insecticide solution solvent from such droplets over the course of their trajectory to the ground.

The insecticide particles so applied are widely dispersed and small enough to enter breathing pores of the insects. Such finely sized particles are believed to be more effective than coarser insecticide particles in mosquito control and are also believed to be less harmful to larger insect species, such as bumblebees, and dragonflies, than coarser particles.

Preferably, a source of concentrated insecticide is coupled to a source of water under pressure, e.g. a garden hose, and both said sources are coupled to spray means via valving means hereinafter described. The valving means are activated to spray a selected combination of concentrated insecticide and water as a fogged dispersion, preferably upon a shift of wind direction and essentially at no other time and preferably to do so automatically. The spray means are constructed and arranged to provide a long time of flight, preferably through an elevated height thereof and initiation of spray only upon a fresh breeze so that fine droplets are buoyantly elevated and tumbled.

Pilot control means for said valving means may comprise a wind responsive means drivingly connected to one or more switching elements of multiple sets of switching contacts and corresponding channels. Closing any of the multiple contact sets in any of the channels closes a circuit for valve operation to initiate fogging when there is a change in wind direction. Timing means are provided to cut off fogging in three minutes, or less, after initiation.

Once a change of wind direction initiates fogging the set of switching contacts and channel used thereby is unable to initiate a new cycle of fogging until it is reset manually or automatically. The automatic reset may comprise a timer or means responsive to a condition normally related to the appropriate lapse of time for reset, e.g. and AND circuit activated when all of the switching channels have been used, or a reset circuit responsive to activation of the channel which responds to wind from a direction which rarely occurs other than at night in the area.

The valving and spray nozzle means comprise means for mixing a first flow of water with concentrated insecticide solution or suspension to form a mixture and then mixing that mixture with a second flow of water to form a final spray mixture. A common mixing valve spool controls the first flow rate and mixed flow rate and is adjustable to selectively regulate insecticide concentration in the final spray mixture to the minimum necessary amount for effective insect suppresion, ensuring evaporation of carrier and solvent liquids, reducing nuisance effects and conserving insecticide supply.

These and other objects, features and advantages of the invention will be apparent from the following detailed description with reference therein to the accompanying drawing in which:

DETAILED DESCRIPTION OF PREFERRED EMBODIMENTS

Figure 1B:
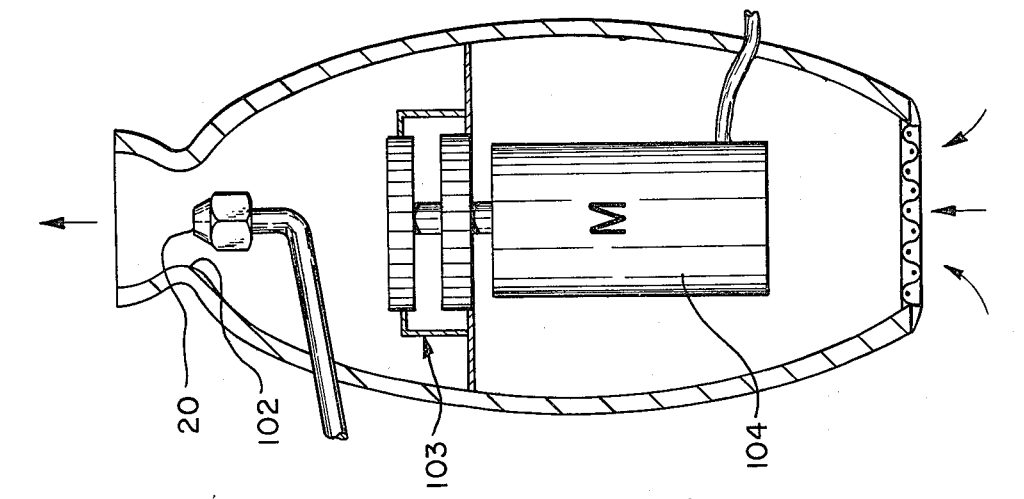
FIGS. 1A and 1B are similar isometric views of fogging nozzle portions of apparatus of additional preferred embodiments of the invention.
Figure 1:
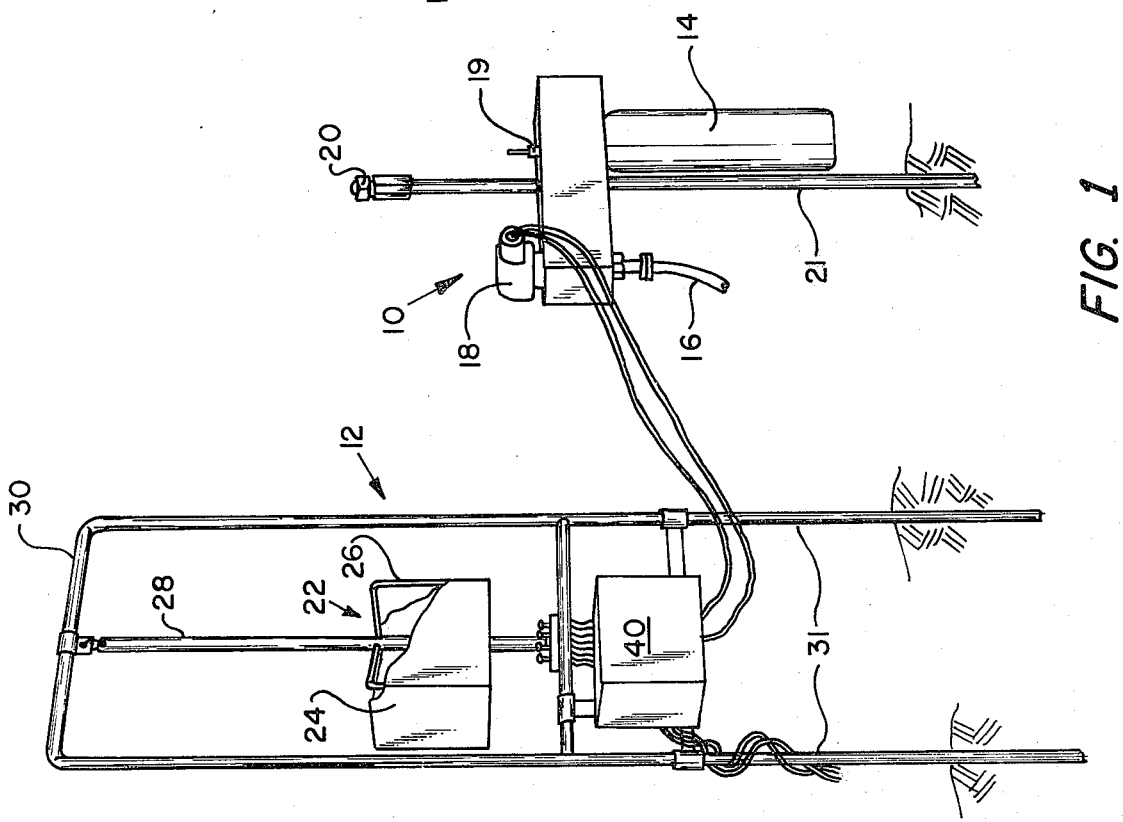
FIG. 1 is an isometric view of apparatus for automatically fogging for limited times upon changes of wind direction in accordance with a first preferred embodiment of the invention.

Referring to FIG. 1 there is shown an insecticide fogging assembly 10 and a control assembly 12. The insecticide fogging assembly comprises a container of concentrated insecticide solution 14 and a source of water under pressure such as a garden hose 16 connected via a solenoid operated valve, 18 and mixing valve 19, described below, to a spray nozzle 20. The fogging assembly is supported in an elevated position by a post 21.

The nozzle 20 is preferably a fogging nozzle such as Sprayco Inc.'s Waterfog nozzle which can pass a gallon per hour of aqueous solutions or suspensions at 40–60 psi pressure. The nozzle 20 points straight up and since fogging is initiated by a wind direction change, the vapor will be carried in the prevailing direction of the fresh wind. The nozzle 20 is at least 10 feet, preferably 15 feet, above ground for household patio usage and still higher for coverage of larger areas.

The preferred solution to be used in tank 14 for mosquito control is a half and half mixture of a first five percent solution of Ortho Chemical's Malathion brand insecticide and s second fifty percent solution of Ortho Chemical's Diazone brand solution. A quart of such mixture further diluted by a factor of at least ten times or more in carrier fluid and dispensed for 90 seconds at each wind change with reset at 30 hour intervals may last a full spraying season, particularly when there are periods of little or no mosquito nuisance and reset is avoided during such periods.

The solenoid is activatable by a control system comprising an omnidirectional sail 24 in the form of a sheer fabric 24 stretched over a frame 26 into a four-sided tubular form. The frame and fabric are freely suspended together with a metal pipe 28 from an overhead bar 30 of U-form with two legs inserted into pipe supports 31 which are rigidly inserted into the ground. Preferably both the sail 24 and nozzle 20 are at least 6 feet above ground.

The pipe 28 serves as a switching contact and may be wind driven via the sail against any of contacts 31–38. The alternative switches defined between bar 28 and any of contacts 31–38 close one of several alternative pilot valve activating circuits contained in a control circuit 40, now described in connection with FIG. 2.

Referring to FIG. 2, there is shown a schematic circuit diagram of suitable apparatus for disabling solenoid valve 18 after it has opened for spraying in a particular direction in a spraying cycle involving spraying in every one of the eight directions once, and only once, during each cycle. Where convenient certain parameter values are specified. The circuit includes eight like latching circuits including silicon controlled rectifiers, SCR1-SCR8, respectively, and associated circuit components. Since these circuits are identical, only the circuit associated with SCR1 has parameter values indicated.

Each of direction selecting contacts 31–38 is coupled to the gate electrode, such as 41, of an associated SCR through a capacitor, such as 42. The anodes of each SCR are connected to the +12 volt dc potential on line 43 through normally closed manual off and reset switch 44. The cathode of each SCR is coupled to the gate electrode of solenoid driver SCR9 through a coupling network comprising pulse passing and blocking diodes D1–D8, respectively, and an associated coupling capacitor, such as capacitor 45.

Winding 46 of solenoid 18 is in series with the anode of SCR9 and normally closed bimetal switch 47 comprising a 300 ohm heater and heat sensitive bimetallic switching elements. The base of swinging contact grounding transisitor T1 is also coupled to the cathode of SCR9 for grounding swinging contact 28 during spraying.

A bridge rectifier 48 receives a potential between terminals 49 and 50 from a 12 volt ac or dc source to provide the 12 volt potential on line 43.

Having described the physical arrangement of the circuit, its mode of operation will now be briefly described. Initially, switch 44 opens to turn all the silicon controlled rectifiers off. The next wind movement will then move swinging contact 28 to a respective one of wind direction contacts 31–38, for example contact 31, thereby coupling a positive potential rise through then-closed switch 44 and capacitor 42 to gate electrode 41, thereby turning SCR1 on. When SCR1 turns on, it develops a positive pulse on its anode coupled by diode D1 and capacitor 45 to the gate electrode of SCR9, thereby turning that device on to cause current to flow in winding 46 of solenoid 18 and switch 47 until switch 47 opens after an interval corresponding to the desired spraying interval. Conduction of SCR9 also causes transistor T1 to conduct and effectively ground swinging contact 28 so that it cannot turn on any other SCR during a spraying interval.

When bimetal switch 47 opens, SCR9 turns off to de-energize solenoid 18. Transistor T1 also turns off so that swinging contact 28 is again at substantially the 12 volt potential on line 43. However, SCR1 remains latched on. Thus, if swinging contact 28 engages directional contact 31, SCR1 will not produce an output pulse and solenoid valve 18 remains closed. Operation is the same for each of the other latching circuits. After several of SCR1-SCR8 have been turned on, switch 44 may be reset to cause the cycle to be repeated.

While FIG. 2 shows a manual means for resetting the silicon controlled rectifiers, it is within the principles of the invention to achieve the resetting automatically. For example, switch 44 may be reset by a timing mechanism that may cause it to operate, for example, once every 48 hours. Alternatively, switch 44 may be electronically opened by using suitable logic means, comprising an AND gate, for example, that responds to all of SCR1-SCR8 being on to open switch 44 for an interval long engough to end conduction and thereafter close so that the circuit is ready for another cycle.

The fogging spray assembly 10 is shown in detail in FIGS. 3–4. FIG. 3 is a top view of the assembly wherein solenoid valve 18, spray nozzle 20, and mixing control plug valve 19 and a hold down screw 191 therefor are shown. FIG. 4 is a sectioned plan view of the passage defining the interior of the valve housing 70, the section being taken in steps as indicated by arrow 4—4 in FIG. 3.

The valve housing 70 has fittings 72 and 74 for respectively inserting a garden hose coupling 16 and a steel tank 14 filled with concentrated insecticide solution.

The internal water passage from fitting 72 to nozzle 20 comprises sections 76, 78, 80, 82, a lateral section 84, 86, mixing with and displacing the insecticide in container 14, 88, 90 and 92. A portion of the water flow bypasses 84, 86, 14, 88 by passing through an axial hole 94 in plug valve 19 directly from passage segment 82 to passage segment 90. Cutaway grooves 96 and 98 are within lines 82 and 90, respectively, to define flow areas therein and extend in skew relation, preferably orthogonally, with respect to each other. Such flow areas are changed inversely by rotating spool 19.

An O-ring gasket 99 prevents leakage. A well 95 and packing 97 therein collect precipitates and entrained solids from the flowing liquids. The passage sections are all formed of intersecting drill holes and further drill holes 93 accommodate plugs 91. Ball 77 acts as a check valve.

Figure 1A:
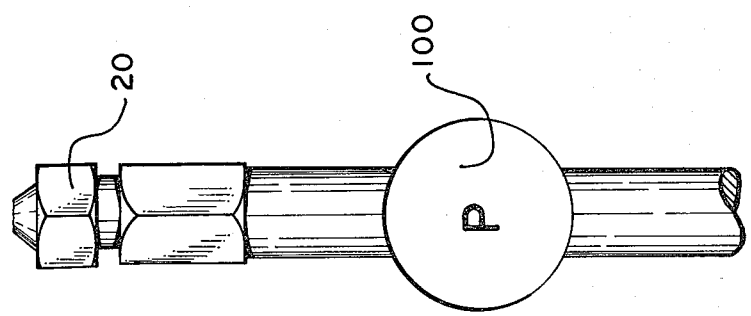
Figure 2:
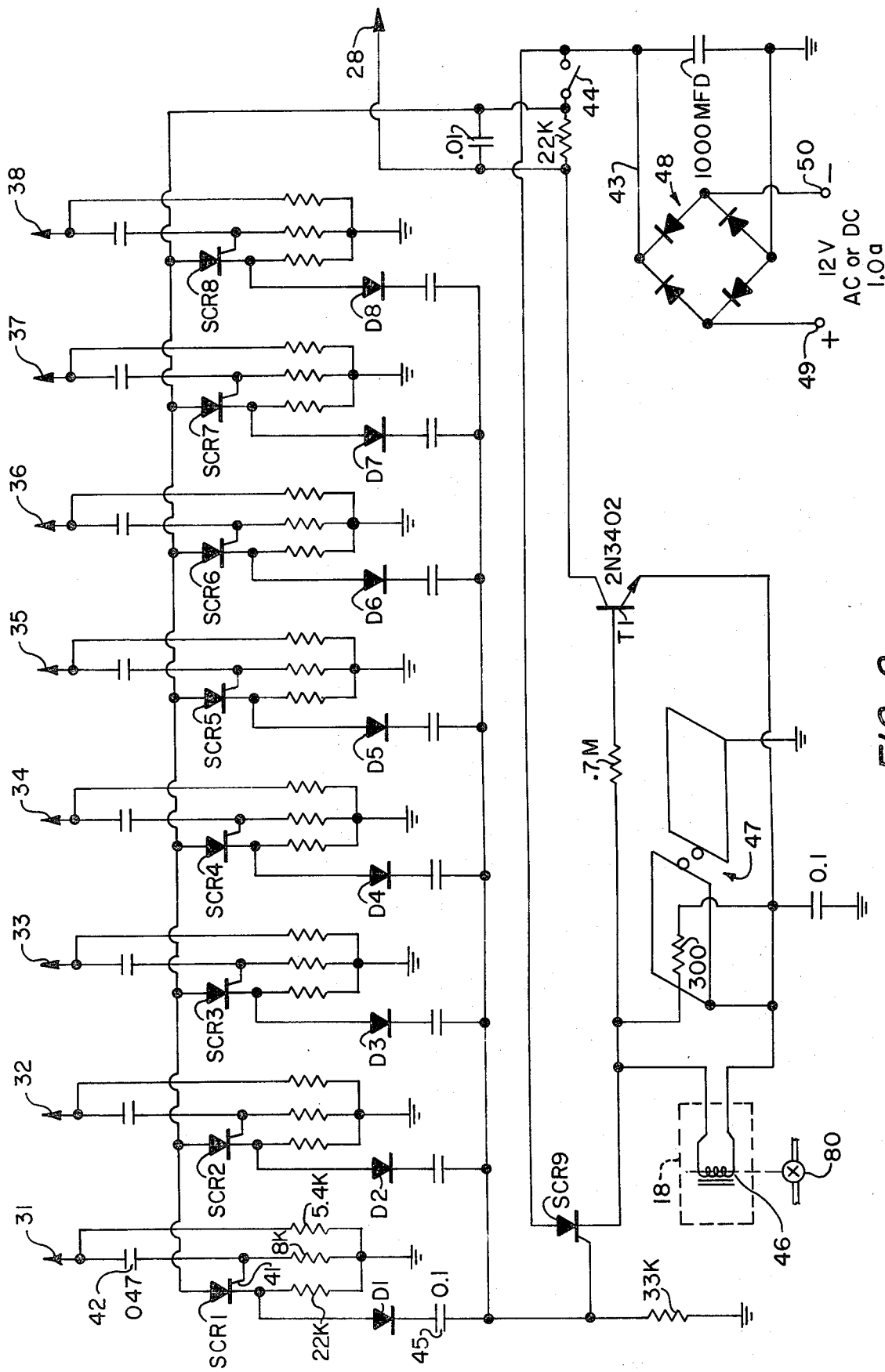
FIG. 2 is a circuit diagram of the fogging control circuit of the FIG. 1 apparatus.
Figure 3:
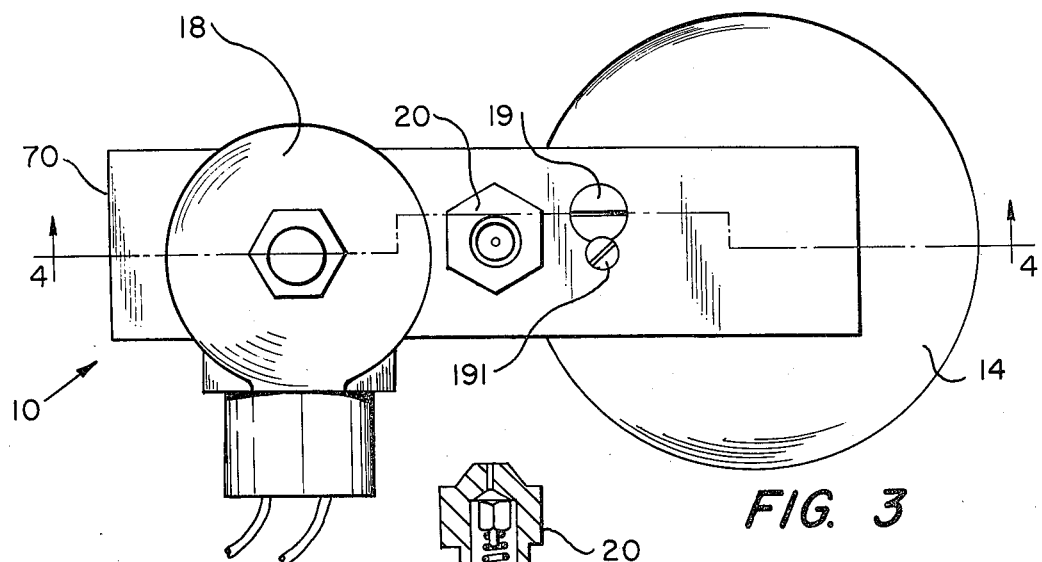
FIG. 3 is a top view of the fogging means of the FIG. 1 embodiment.
Figure 4:
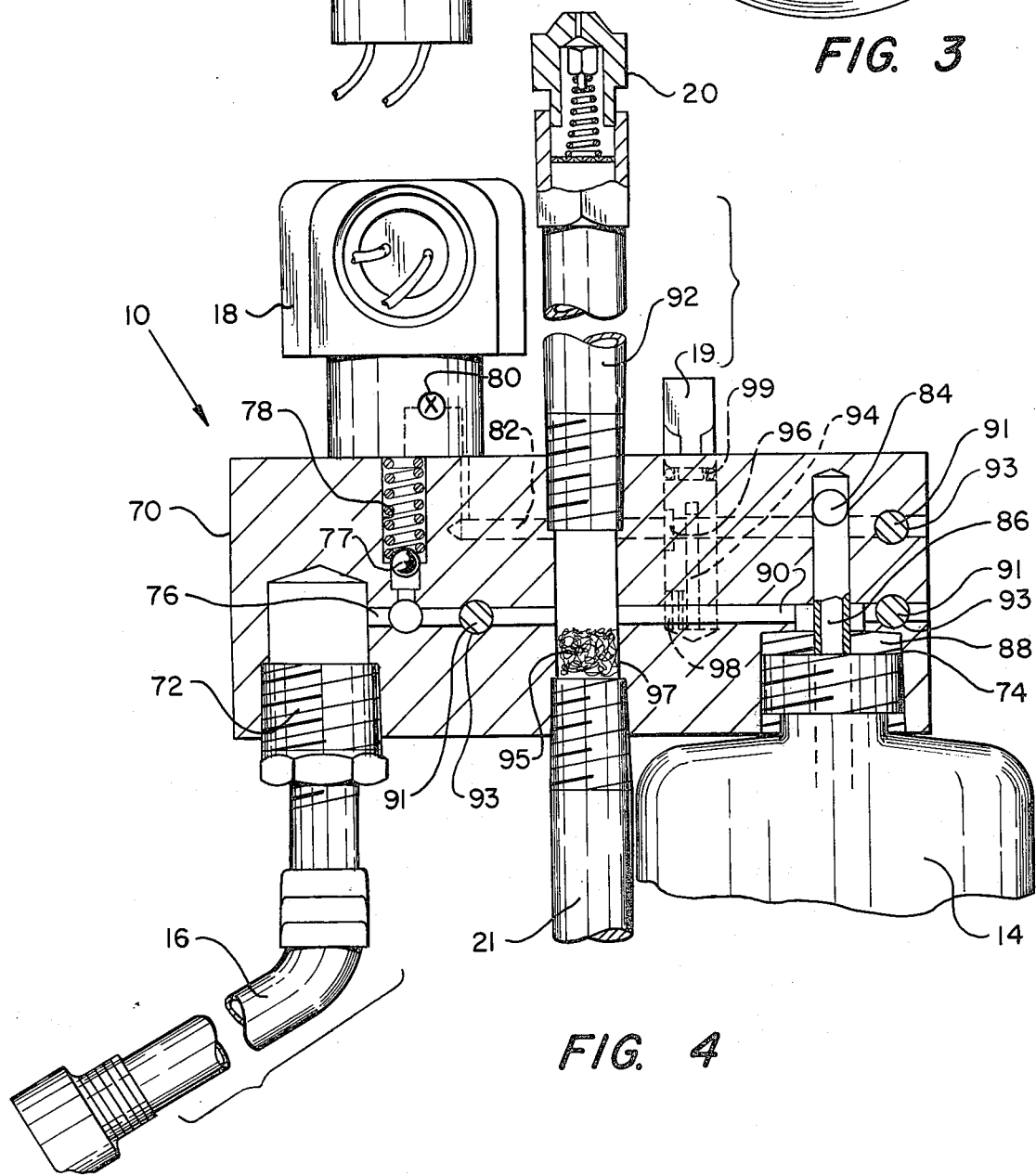
FIG. 4 is a sectional view taken as indicated by arrow 4—4 in FIG. 3.

Referring now to FIGS. 1A and 1B there are shown portions of apparatus of second and third embodiments of the invention identical to the embodiment of FIG. 1-4 in all respects excepting that in FIG. 1A a pump 100 is inserted into the nozzle feed pipe downstream of the insecticide/carrier liquid mixing and in FIG. 1B, a gas blower assembly 101 augments the hydrostatic pressure spray driving force. Both embodiments impart additional energy to the mixed liquid flows. This additional energy together with the energy available through hydrostatic pressure of the carrier liquid enhances the fineness of dispersion of insecticide and also propels the spray higher to allow more airborne time for the droplets sprayed into a fresh wind. The additional time ensures further horizontal distance coverage, particularly useful in providing coverage to large areas such as golf courses, and more complete evaporation of water and solvent from the insecticide containing droplets before the droplet residues strike ground (including trees, leaves, bushes or other ground structures).

The blower assembly 10 of FIG. 1B may be, for instance, the Atomist No. 1020 coarse spray fogging unit of Root-Lowell Corporation of Lowell, Michigan, or equivalent apparatus, modified as shown in FIG. 1B to entrain the fine spray coming out of nozzle 20 and modified to point upwardly instead of horizontally. The blower assembly 101 comprises a Venturi nozzle 102 fed with air by two stage centrifugal blower 103 driven by a motor 104. The fogging nozzle 20 of FIGS. 1-4 is centered in the Venturi nozzle 102 and located axially slightly downstream of the nozzle throat. The FIG. 1B modification enables projection of the fine spray to heights on the order of 100 feet and coverages of several hundred square feet of downwind area in each of the wind activating directions.

It will be understood that the apparatus modifications of FIGS. 1A and 1B, relative to FIG. 1, may also be combined.

In all of the foregoing embodiments conditions of mixing and spraying are controlled to produce a molecular or near molecular dispersion of insecticide solute or other material to be sprayed. For insecticide coverage of a small area, the control should yield a dissipation of the droplets into water vapor at less than 40 feet, from the nozzle 20 along the horizontal path of airborne droplet trajectory. The control parameters include nozzle height, sail stiffness and/or circuitry modifications to set a threshhold of wind force for activation, supplementary pressures of blower and/or pump if used, hydrostatic pressures of the carrier flow and mixing ratio of carrier and insecticide solution.

Mixing ratio is also controlled to produce the barest detection of solvent odor in the spray to avoid overuse insecticide solution.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A method of controlled spraying comprising.
    sensing each occurrence of the wind exceeding a predetermined velocity from a predetermined plurality of directions at a predetermined location,
    intermittently providing a spray into said wind for a predetermined time interval from said predetermined location upon sensing only predetermined ones of said occurrences.

2. A method of controlled spraying in accordance with claim 1 wherein said spray is provided upon sensing said occurrences so that the spray provided upon sensing a said occurrence from each direction is substantially equal to that provided upon sensing an occurrence from each of the other directions.

3. Fogging method according to claim 1 and further comprising,
    mixing a source of a solute to be dispersively applied over a given area with a carrier flow of liquid to produce a mixed flow of liquid,
    spraying said mixed flow into the air as a fogged dispersion of fine liquid particles seeded with solute, and,
    controlling conditions of spraying to evaporate at least the majority of carrier liquid from said solute before the sprayed particles strike the ground.

4. Fogging method in accordance with claim 3 wherein said source of solute comprises a solution thereof which is suspendable in said carrier liquid,
    the selection of solution solvent and spray trajectory of said liquid particles being controlled to evaporate a majority of said solvent before the sprayed particles reach the ground.

5. Fogging method in accordance with claim 3 wherein spraying is maintained essentially solely upon occurence of a first fresh ambient wind of any selected direction in a selected period of time.

6. Fogging method in accordance with claim 3 and further comprising.
    blowing a gas to enhance the horizontal component wind blown trajectory of said particles.

7. A method of controlled spraying in accordance with claim 1 and further including the steps of providing a spray upon sensing the wind exceeding a predetermined velocity from each of said plurality of directions only once in a selected time interval that is much greater than said predetermined time interval.

8. A method of controlled spraying in accordance with claim 6 wherein said selected time interval is of the order of 24 hours.

9. A method of controlled spraying in accordance with claim 8 wherein said spray is provided upon sensing said occurrences so that the spray provided upon sensing a said occurrence from each direction is substantially equal to that provided upon sensing an occurrence from each of the other directions.

10. A method of controlled spraying in accordance with claim 1 and further comprising,
    mixing a source of spray material to be dispersively applied over a given area with a carrier flow of liquid to produce a mixed flow of liquid,
    spraying said mixed flow into the air as a dispersion of fine liquid particles seeded with said material, and controlling conditions of spraying to evaporate at least the majority of carrier liquid from said material before the sprayed particles strike the ground.

11. A method of controlled spraying in accordance with claim 2 wherein said source of material comprises a solution thereof in nonaqueous solvent which is suspendable in aqueous carrier liquid, said carrier liquid being water, the selection of solution solvent and spray trajectory of said liquid particles being controlled to evaporate a majority of the solvent and carrier liquid therein before the sprayed particles reach the ground.

12. A method of controlled spraying in accordance with claim 3 and further comprising, blowing a gas to enhance the horizontal component of wind blown trafectory of said particles.

13. A method of controlled spraying in accordance with claim 2 wherein the material sprayed is an insecticide chemical and said source comprises an insecticide solute in a solvent which is suspendable in water and said carrier liquid comprises water.

14. A method of controlled spraying in accordance with claim 13 wherein dilution of said solute in said mixed flow is at least ten times its dilution in said solution.

15. A method of controlled spraying in accordance with claim 14, and further comprising, monitoring an indicator of spray concentration and adjusting mixing ratio of said carrier and solution to substantially maintain a preselected concentration.

16. A method of controlled spraying in accordance with claim 13 and further comprising, determining shifts in wind direction in a region to be protected, automatically initiating spraying in said region upon detection of at least one wind shift to a new direction, terminating each such spraying operation at a first preselected time interval after initiation, and suppressing further initiations of spraying in response to shift of wind to a given direction for a second time interval after a prior initiation of spraying in response to first shifts of wind to said directions.

17. A method of controlled spraying in accordance with claim 16 and further comprising, automatically initiating said spraying in response to first shifts of wind to any of multiple directions.

18. A method of controlled spraying in accordance with claim 16 wherein said first time interval is no greater than 150 seconds.

19. A method of controlled spraying in accordance with claim 16 wherein said second time interval is essentially at least 1 hour.

20. A method of controlled spraying in accordance with claim 19 wherein said second time interval is at least 8 hours.

21. Spraying apparatus comprising, means for sensing each occurrence of the wind exceeding a predetermined velocity from a predetermined plurality of directions at a predetermined location, and means for intermittently providing a spray into said wind for a predetermined time interval from said predetermined location upon sensing only predetermined ones of said occurrences.

22. Spraying apparatus in accordance with claim 14 and further comprising, means defining a pressurized carrier liquid source, means for mixing carrier liquid from said carrier liquid source with insecticide from said insecticide source to produce a spray mixture, and means for dispersing and spraying said spray mixture.

23. Spraying apparatus in accordance with claim 21 and further comprising, means for blocking spraying, means for unblocking said blocking means in response to an initiating and latching signal, means for producing an initiating and latching signal in response to sensing a predetermined one of said occurrences, and means for suppressing production of a new initiating and latching signal by said signal producing means until reset, and means for so resetting said signal producing means, 24. Spraying apparatus in accordance with claim 23 wherein said means for blocking and unblocking comprise an electrically operated valve, said means for producing an initiating signal comprise electrical power source means connected in circuit to said electrically operated valve via a gated solid state valve, means for producing a gating signal to said valve in response to a change in wind direction to complete said circuit, and means responsive to closing of said circuit for reopening said circuit after said first interval without resetting said solid state valve.

25. Spraying apparatus in accordance with claim 24 wherein said means for reopening said circuit comprise heat responsive switch means in said circuit responsive to heating to open the circuit and an electrical heater therefor, said electrical heater being connected in said circuit in series with said solid state valve.

26. Spraying apparatus in accordance with claim 24 and further comprising, a plurality of gating signal producing means together with associated wind direction change responsive switches in parallel in said circuit, said switches being responsive to changes in different directions of the wind.

27. Spraying apparatus in accordance with claim 26 wherein said plural gating signal producing means comprise latching SCR circuits interconnected in parallel to a gate electrode of said solid state valve by parallel solid state coupling networks, and further comprising, means effective during operation of said valve in response to one of said circuits to prevent operation of any of the other circuits.

* * * * *